United States Patent
Han et al.

(10) Patent No.: US 10,862,887 B2
(45) Date of Patent: Dec. 8, 2020

(54) MULTIPLE DOMAIN AUTHENTICATION USING DATA MANAGEMENT AND STORAGE NODE

(71) Applicant: Rubrik, Inc., Palo Alto, CA (US)

(72) Inventors: Seungyeop Han, Sunnyvale, CA (US); Shrihari Kalkar, Santa Clara, CA (US)

(73) Assignee: RUBRIK, INC., Palo Alto, CA (US)

( * ) Notice: Subject to any disclaimer, the term of this patent is extended or adjusted under 35 U.S.C. 154(b) by 260 days.

(21) Appl. No.: 16/133,494

(22) Filed: Sep. 17, 2018

(65) Prior Publication Data

US 2020/0092286 A1  Mar. 19, 2020

(51) Int. Cl.
*G06F 3/06*         (2006.01)
*H04L 29/06*        (2006.01)
*G06F 9/455*        (2018.01)
*G06F 16/951*       (2019.01)

(52) U.S. Cl.
CPC ...... *H04L 63/0876* (2013.01); *G06F 9/45558* (2013.01); *G06F 16/951* (2019.01); *H04L 63/102* (2013.01); *G06F 2009/45595* (2013.01)

(58) Field of Classification Search
CPC ......... G06F 11/1076; G06F 2211/1028; G06F 3/067; H04L 63/0428; H04L 67/1097
See application file for complete search history.

(56) References Cited

U.S. PATENT DOCUMENTS

2016/0239437 A1*  8/2016  Le ..................... G06F 21/6218
2017/0169233 A1*  6/2017  Hsu .................... G06F 21/602
2020/0026425 A1*  1/2020  Memon ................ H04L 67/10

\* cited by examiner

*Primary Examiner* — Olugbenga O Idowu
(74) *Attorney, Agent, or Firm* — Schwegman Lundberg & Woessner, P.A.

(57) ABSTRACT

A data management and storage (DMS) cluster of peer DMS nodes provides domain shares and authentication for different domains. Each DMS node includes a domain manager and multiple containers, each container including a domain share. Each container associated with a domain may provide an authentication service for authenticating users for a different domain to access domain shares of the domain, such as by contacting a domain controller of a compute infrastructure associated with the domain. The domain manager controls the creation and deletion of containers and their domain shares. The domain manager also provides a proxy service for the containers for communication with client devices of different domains external to the DMS cluster.

20 Claims, 14 Drawing Sheets

Service Schedule 222

| machine_user_id | machine_id | SLA |
|---|---|---|
| VM01 | m001 | standard VM |
| VM02 | m002 | standard VM |
| PM04 | m003 | standard PM |
| VM07 | m004 | high frequency |
| PM01 | m005 | short life |
| | ... | |

FIG. 3A

Job Queue 224

| job_id | start_time | job_type | job_info |
|--------|------------|----------|----------|
| 00001 | 0600 | pull snapshot | target = m001 |
| 00002 | 0600 | pull snapshot | target = m005 |
| 00003 | 0610 | replicate | target = m003 |
| 00004 | 0615 | run analytics | target = m002 |
| 00005 | 0615 | trash collection | xxx |
| ... | | | |

FIG. 3B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | |
| ... | | |

Image Table 228

| im_id | im_location |
|---|---|
| m001.im1 | ... |
| m001.im1-2 | |
| m001.im2-3 | |
| m001.im3-4 | |
| m001.im4-5 | |
| ... | |

FIG. 3C

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, . . ., m001.im4-5 |
| m001.ss6 | 20171002.0900 | ... |
| ... | | |
| m001.ss12 | 20171003.2100 | m001.im1, . . ., m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | |
| m001.im11-12 | |

FIG. 4A

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | |
| m001.im11-12 | |

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, ..., m001.im4-5 |
| m001.ss6 | 20171002.0900 | |
| ... | ... | ... |
| m001.ss12 | 20171003.2100 | m001.im1, ..., m001.im11-12 |

FIG. 4B

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | ... |
| ... | |
| m001.im11-12 | |
| m001.im5 | |

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im5 |
| m001.ss6 | 20171002.0900 | ... |
| ... | | |
| m001.ss12 | 20171003.2100 | m001.im5, ..., m001.im11-12 |

FIG. 4C

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im5 |
| m001.ss6 | 20171002.0900 | ... |
| ... | | |
| m001.ss12 | 20171003.2100 | m001.im5, ..., m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | ... |
| m001.im11-12 | |
| m001.im5 | |
| m001.im5-1 | |

FIG. 4D

MULTIPLE DOMAIN AUTHENTICATION USING DATA MANAGEMENT AND STORAGE NODE

BACKGROUND

1. Technical Field

Embodiments generally relates to interoperability for managing, storing, and recovering data, for example, of hosts using different domains.

2. Background Information

The amount and type of data that is collected, analyzed and stored is increasing rapidly over time. The compute infrastructure used to handle this data is also becoming more complex, with more processing power and more portability. As a result, data management and storage is increasingly important. One aspect of this is reliable data backup and storage, and fast data recovery in cases of failure. Another aspect is data portability across locations and platforms.

At the same time, virtualization allows virtual machines to be created and decoupled from the underlying physical hardware. For example, a hypervisor running on a physical host machine or server may be used to create one or more virtual machines that may each run the same or different operating systems, applications and corresponding data. In these cases, management of the compute infrastructure typically includes backup and retrieval of the virtual machines, in addition to just the application data. However, various different platforms are offered for virtualization, including VMware, Microsoft Hyper-V, Microsoft Azure, GCP (Google Cloud Platform), Nutanix AHV, Linux KVM (Kernel-based Virtual Machine), and Xen. While users may desire to have their applications and data be machine-agnostic, it typically is not easy to port applications and data between different platforms. Furthermore, different compute infrastructures may use different operating systems, protocols, and authentication.

Thus, there is a need for better approaches to managing and storing data, particularly across different virtual machine platforms, and in providing interoperability for different computing infrastructures.

SUMMARY

A data management and storage (DMS) cluster of peer DMS nodes provides domain shares and directory service authentication for different domains. In some embodiments, a domain manager of a DMS node creates a container for a domain of the compute infrastructure. The container includes one or more domain shares. The domain manager selects the container for receiving a request from a client device of the compute infrastructure associated with the domain from a plurality of containers associated with different domains based on the domain of the client device corresponding to the domain of the container. The container receives the request for access to the domain share from the domain manager. The container determines whether the client device is authorized to access to the domain share based on contacting the compute infrastructure with authentication information from the client device. The domain share connects with the client device in response to the client device being authorized to access the domain share.

Some embodiments include a data management and storage (DMS) cluster, including: a plurality of peer DMS nodes that service a first compute infrastructure and a second compute infrastructure; and a distributed data store implemented across the peer DMS nodes. Each of the peer DMS nodes includes: a first container for a first domain of the first compute infrastructure, the first container including a first domain share generated from one or more snapshots of the first compute infrastructure stored in the distributed data store; and a second container for a second domain of the second compute infrastructure, the second container including a second domain share generated from one or more snapshots of the second compute infrastructure stored in the distributed data store. Each container running on DMS node can have one or more domain shares. Each of the peer DMS nodes further includes a domain manager configured to: receive authentication information from a client device; determine a domain of the client device; send the authentication information to the first container to authorize the client device for access to the first domain share in response to the domain being the first domain; and send the authentication information to the second container to authorize the client device for access to the second domain share in response to the domain being the second domain.

Some embodiments include a non-transitory computer-readable medium comprising instructions that when executed by a processor cause the processor to execute a method for providing a domain share to a compute infrastructure serviced by the DMS cluster, the DMS cluster including a plurality of peer DMS nodes. The method includes: a domain manager of a DMS node creating a container for a domain of the compute infrastructure, the container including a domain share; the domain manager selecting the container for receiving a request to access the domain share from a client device of the compute infrastructure associated with the domain from a plurality of containers associated with different domains based on the domain of the client device corresponding to the domain of the container; the container receiving the request for access to the domain share from the domain manager; the container determining whether the client device is authorized to access to the domain share based on contacting the compute infrastructure with authentication information from the client device; and the domain share connecting with the client device in response to the client device being authorized to access the domain share.

Other aspects include components, devices, systems, improvements, methods, processes, applications, computer readable mediums, and other technologies related to any of the above.

BRIEF DESCRIPTION OF THE DRAWINGS

FIGS. 3A-3C are DMS tables that illustrate operation of the system of FIGS. 1-2, according to one embodiment.

FIGS. 4A-4D are DMS tables that illustrate updating of snapshot images, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Embodiments relate to providing domain shares of different domains with proper authentication and interoperability by a data management and storage (DMS) node of a DMS cluster. Each peer DMS node includes a domain manager and multiple containers each including one or more domain shares associated with a domain. Each container provides an authentication service for controlling access to a domain share of a domain. The domain manager of a DMS node manages the creation and configuration of the containers and domain shares. The domain manager also configures a proxy for routing connections from external devices to the proper container and domain share according to domain. In some embodiments, domain shares also provide interoperability services on behalf of the DMS cluster, allowing the DMS cluster to provide DMS services to different computing infrastructure types (e.g., operating systems) and proper authentication for each type. By placing the domain shares for different domains in different containers, a single DMS node can join multiple domains and authenticate properly with them for serving domain shares to each domain.

Figure 1:
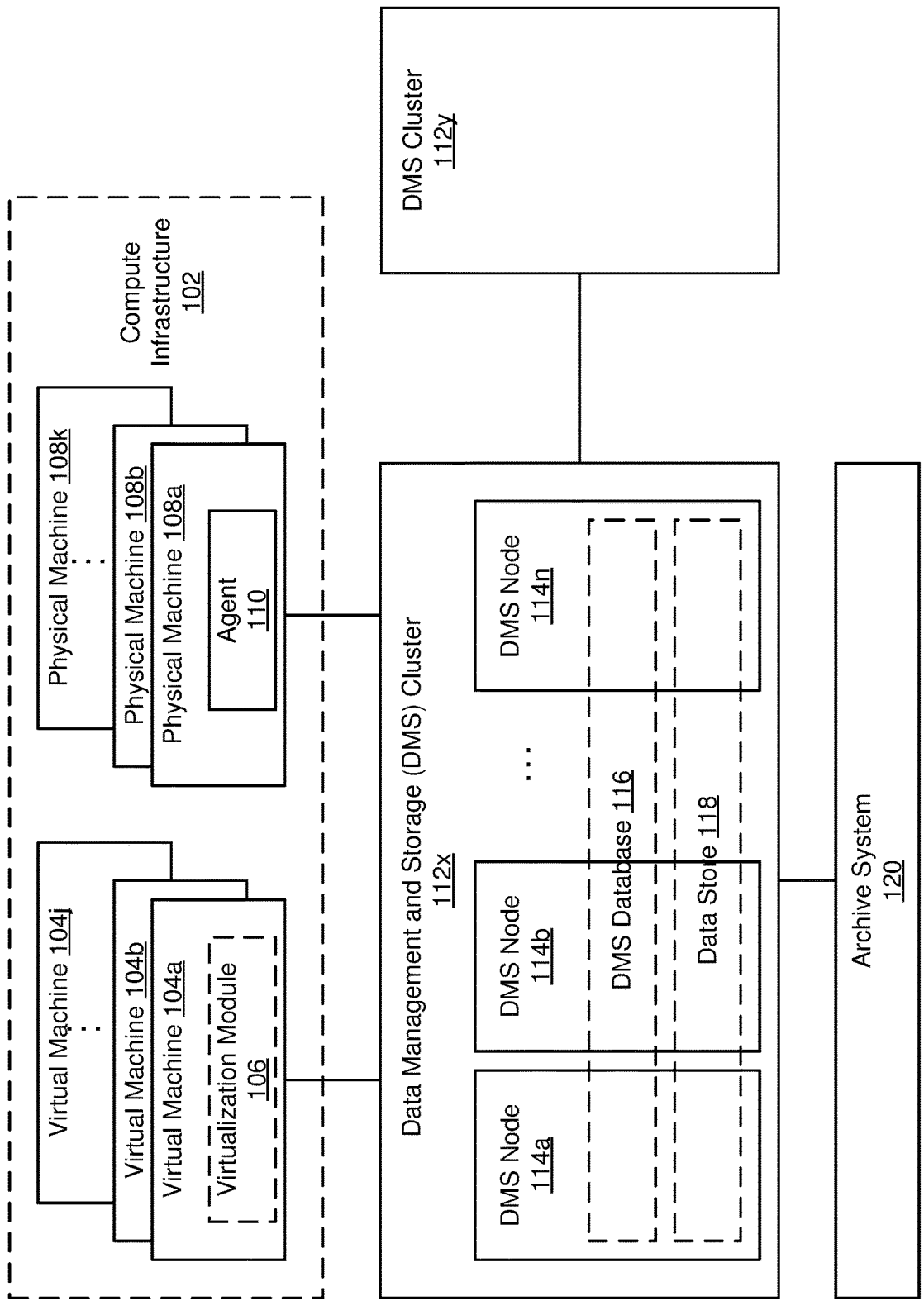
FIG. 1 is a block diagram of a system for managing and storing data, according to one embodiment.

In more detail, FIG. 1 is a block diagram illustrating a system for managing and storing data, according to one embodiment. The system includes a data management and storage (DMS) cluster 112x, a secondary DMS cluster 112y and an archive system 120. The DMS system provides data management and storage services to a compute infrastructure 102, which may be used by one or more tenants. Examples of tenants may include an enterprise such as a corporation, university, or government agency. Many different types of compute infrastructures 102 are possible. Some examples include serving web pages, implementing e-commerce services and marketplaces, and providing compute resources for an enterprise's internal use. The compute infrastructure 102 can include production environments, in addition to development or other environments.

The compute infrastructure 102 includes both virtual machines (VMs) 104a-j and physical machines (PMs) 108a-k. The VMs 104 can be based on different protocols. VMware, Microsoft Hyper-V, Microsoft Azure, GCP (Google Cloud Platform), Nutanix AHV, Linux KVM (Kernel-based Virtual Machine), and Xen are some examples. The physical machines 108a-n can also use different operating systems running various applications. Microsoft Windows running Microsoft SQL or Oracle databases, and Linux running web servers are some examples. In some embodiments, the virtual machines 104 are software simulations of computing systems that execute on one or more of the physical machines 108. Each physical machine 108 may be a host machine that includes a hypervisor that create and executes one or more virtual machines 104 of tenants 122. Additional details regarding a multi-tenant compute infrastructure 102 are discussed below in connection with FIG. 2B.

The DMS cluster 112 manages and stores data for the compute infrastructure 102, such as for one or more tenants of the compute infrastructure. This can include the states of machines 104, 108, configuration settings of machines 104, 108, network configuration of machines 104, 108, and data stored on machines 104, 108. Example DMS services includes backup, recovery, replication, archival, and analytics services. The primary DMS cluster 112x enables recovery of backup data. Derivative workloads (e.g., testing, development, and analytic workloads) may also use the DMS cluster 112x as a primary storage platform to read and/or modify past versions of data.

In this example, to provide redundancy, two DMS clusters 112x-y are used. From time to time, data stored on DMS cluster 112x is replicated to DMS cluster 112y. If DMS cluster 112x fails, the DMS cluster 112y can be used to provide DMS services to the compute infrastructure 102 with minimal interruption.

In some embodiments, the DMS cluster 112 provides the DMS services as a managed service provider (MSP) to one or more tenants of the compute infrastructure 102. In some embodiments, the DMS cluster 112 may be connected to multiple compute infrastructures 102 to provide the DMS services. Different tenants, whether in the same compute infrastructure 102 or in separate compute infrastructures 102, each may be associated with a domain. The DMS cluster 112 supports authenticating to multiple domains to provide the DMS services, as discussed in greater detail in connection with FIGS. 2C and 5.

Archive system 120 archives data for the computer infrastructure 102. The archive system 120 may be a cloud service. The archive system 120 receives data to be archived from the DMS clusters 112. The archived storage typically is "cold storage," meaning that more time can be spent to retrieve data stored in archive system 120. In contrast, the DMS clusters 112 provide faster data retrieval, such as for backup recovery.

The following examples illustrate operation of the DMS cluster 112 for backup and recovery of VMs 104. This is used as an example to facilitate the description. The same principles apply also to PMs 108 and to other DMS services.

Each DMS cluster 112 includes multiple peer DMS nodes 114a-n that operate autonomously to collectively provide the DMS services, including managing and storing data. A DMS node 114 includes a software stack, processor and data storage. DMS nodes 114 can be implemented as physical machines and/or as virtual machines, and in some embodiments, may be implemented in the compute infrastructure 102 or some other compute infrastructure. The DMS nodes 114 are interconnected with each other, for example, via cable, fiber, backplane, and/or network switch. In some embodiments, the end user does not interact separately with each DMS node 114, but interacts with the DMS nodes 114a-n collectively as one entity, namely, the DMS cluster 112. For example, the DMS nodes 114 may be peer DMS nodes each having the capability to perform DMS services, either individually or by working with other DMS nodes 114.

The DMS nodes 114 are peers and preferably each DMS node 114 includes common functionality. The DMS cluster 112 automatically configures the DMS nodes 114 as new nodes are added to the DMS cluster 112 or existing nodes are dropped or fail. For example, the DMS cluster 112 automatically discovers new nodes, or otherwise may control the allocation of DMS nodes 114 to the DMS cluster 112. In this way, the computing power and storage capacity of the DMS cluster 112 is scalable by adding more nodes 114.

The DMS cluster 112 includes a DMS database 116 and a data store 118. The DMS database 116 stores data structures used in providing the DMS services, as will be described in more detail in FIG. 2A. In the following examples, these are shown as tables but other data structures could also be used. The data store 118 contains the backup data from the compute infrastructure 102, for example snapshots of VMs or application files. Both the DMS database 116 and the data store 118 are distributed across the nodes 114, for example using Apache Cassandra. That is, the DMS database 116 in its entirety is not stored at any one DMS node 114. Rather, each DMS node 114 stores a portion of the DMS database 116 but can access the entire DMS database. Data in the DMS database 116 preferably is replicated over multiple DMS nodes 114 to increase the fault tolerance and throughput, to optimize resource allocation, and/or to reduce response time. In one approach, each piece of data is stored on at least three different DMS nodes. The data store 118 has a similar structure, although data in the data store may or may not be stored redundantly. Accordingly, if any DMS node 114 fails, the full DMS database 116 and the full functionality of the DMS cluster 112 will still be available from the remaining DMS nodes. As a result, the DMS services can still be provided.

Considering each of the other components shown in FIG. 1, a virtual machine (VM) 104 is a software simulation of a computing system. The virtual machines 104 each provide a virtualized infrastructure that allows execution of operating systems as well as software applications such as a database application or a web server. A virtualization module 106 resides on a physical host (i.e., a physical computing system) (not shown), and creates and manages the virtual machines 104. The virtualization module 106 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 106 provides an interface for other computing devices to interface with the virtualized infrastructure. In the following example, the virtualization module 106 is assumed to have the capability to take snapshots of the VMs 104. An agent could also be installed to facilitate DMS services for the virtual machines 104.

A physical machine 108 is a physical computing system that allows execution of operating systems as well as software applications such as a database application or a web server. In the following example, an agent 110 is installed on the physical machines 108 to facilitate DMS services for the physical machines.

The components shown in FIG. 1 also include storage devices, which for example can be a hard disk drive (HDD), a magnetic tape drive, a solid-state drive (SSD), or a disk array (e.g., a storage area network (SAN) storage device, or a networked-attached storage (NAS) device). A storage device can be separate from or integrated with a physical machine.

The components in FIG. 1 are interconnected with each other via networks, although many different types of networks could be used. In some cases, the relevant network uses standard communications technologies and/or protocols and can include the Internet, local area networks, and other types of private or public networks. The components can also be connected using custom and/or dedicated data communications technologies.

Figure 2A:
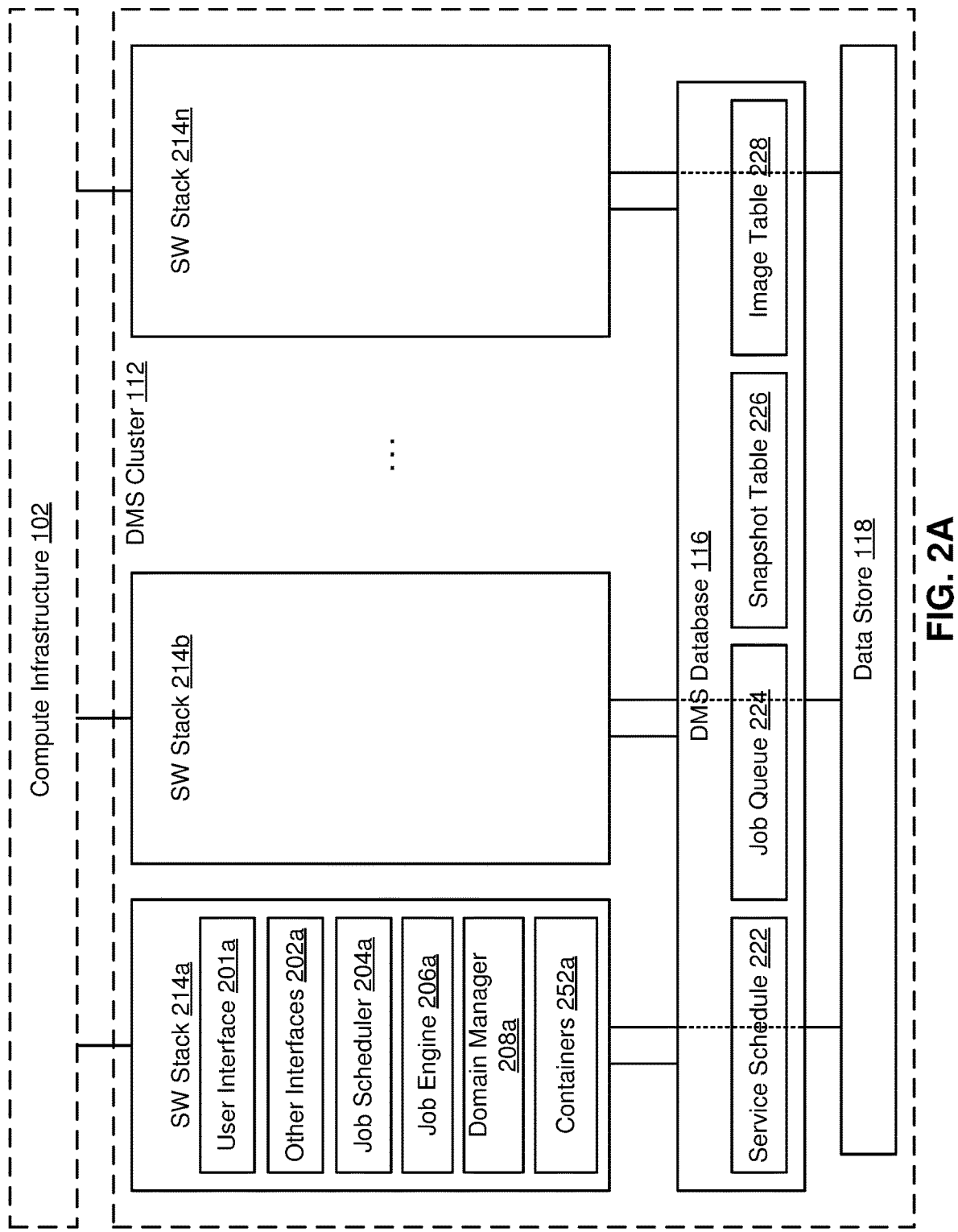
FIG. 2A is a logical block diagram of a data management and storage (DMS) cluster, according to one embodiment.

FIG. 2A is a logical block diagram illustrating an example DMS cluster 112, according to one embodiment. This logical view shows the software stack 214a-n for each of the DMS nodes 114a-n of FIG. 1. Also shown are the DMS database 116 and data store 118, which are distributed across the DMS nodes 114a-n. Preferably, the software stack 214 for each DMS node 114 is the same. This stack 214a is shown only for node 114a in FIG. 2A. The stack 214a includes a user interface 201a, other interfaces 202a, job scheduler 204a, a job engine 206a, a domain manager 208a, and domain controllers 210a. This stack is replicated on each of the software stacks 214b-n for the other DMS nodes. The DMS database 116 includes the following data structures: a service schedule 222, a job queue 224, a snapshot table 226 and an image table 228. In the following examples, these are shown as tables but other data structures could also be used.

The user interface 201 allows users to interact with the DMS cluster 112. Preferably, each of the DMS nodes includes a user interface 201, and any of the user interfaces can be used to access the DMS cluster 112. This way, if one DMS node fails, any of the other nodes can still provide a user interface. The user interface 201 can be used to define what services should be performed at what time for which machines in the compute infrastructure (e.g., the frequency of backup for each machine in the compute infrastructure). In FIG. 2, this information is stored in the service schedule 222. The user interface 201 can also be used to allow the user to run diagnostics, generate reports or calculate analytics.

The software stack 214 also includes other interfaces 202. For example, there is an interface 202 to the computer infrastructure 102, through which the DMS nodes 114 may make requests to the virtualization module 106 and/or the agent 110. In one implementation, the VM 104 can communicate with a DMS node 114 using a distributed file system protocol (e.g., Network File System (NFS) Version 3) via the virtualization module 106. The distributed file system protocol allows the VM 104 to access, read, write, or modify files stored on the DMS node 114 as if the files were locally stored on the physical machine supporting the VM 104. The distributed file system protocol also allows the VM 104 to mount a directory or a portion of a file system located within the DMS node 114. There are also interfaces to the DMS database 116 and the data store 118, as well as network interfaces such as to the secondary DMS cluster 112y and to the archive system 120.

The job schedulers 204 create jobs to be processed by the job engines 206. These jobs are posted to the job queue 224. Examples of jobs are pull snapshot (take a snapshot of a machine), replicate (to the secondary DMS cluster), archive, etc. Some of these jobs are determined according to the service schedule 222. For example, if a certain machine is to be backed up every 6 hours, then a job scheduler will post a "pull snapshot" job into the job queue 224 at the appropriate 6-hour intervals. Other jobs, such as internal trash collection or updating of incremental backups, are generated according to the DMS cluster's operation separate from the service schedule 222.

The job schedulers 204 preferably are decentralized and execute without a master. The overall job scheduling function for the DMS cluster 112 is executed by the multiple job schedulers 204 running on different DMS nodes. Preferably, each job scheduler 204 can contribute to the overall job queue 224 and no one job scheduler 204 is responsible for the entire queue. The job schedulers 204 may include a fault tolerant capability, in which jobs affected by node failures are recovered and rescheduled for re-execution.

The job engines 206 process the jobs in the job queue 224. When a DMS node is ready for a new job, it pulls a job from the job queue 224, which is then executed by the job engine 206. Preferably, the job engines 206 all have access to the entire job queue 224 and operate autonomously. Thus, a job scheduler 204j from one node might post a job, which is then pulled from the queue and executed by a job engine 206k from a different node.

In some cases, a specific job is assigned to or has preference for a particular DMS node (or group of nodes) to execute. For example, if a snapshot for a VM is stored in the section of the data store 118 implemented on a particular node 114x, then it may be advantageous for the job engine 206x on that node to pull the next snapshot of the VM if that process includes comparing the two snapshots. As another example, if the previous snapshot is stored redundantly on three different nodes, then the preference may be for any of those three nodes.

The snapshot table 226 and image table 228 are data structures that index the snapshots captured by the DMS cluster 112. In this example, snapshots are decomposed into images, which are stored in the data store 118. The snapshot table 226 describes which images make up each snapshot. For example, the snapshot of machine x taken at time y can be constructed from the images a,b,c. The image table is an index of images to their location in the data store 118. For example, image a is stored at location aaa of the data store 118, image b is stored at location bbb, etc. More details of example implementations are provided in FIGS. 3 and 4 below.

DMS database 116 also stores metadata information for the data in the data store 118. The metadata information may include file names, file sizes, permissions for files, and various times such as when the file was created or last modified.

The domain manager 208 manages containers for domain shares for multiple domains and authentication to the multiple domains for the DMS cluster 114. The domain manager 208a creates containers 252a that allow the node 114a to join multiple domains and authenticate with each of the domains, such as for serving a domain share to each domain. Each container 252 may hold one or more domain shares and provides an authentication service for the domain shares, such as by communicating with a domain controller of a compute infrastructure 102 associated with a domain. The node 114a may include multiple containers 252, each for a different domain. The domain manager 208 provides a share management service that manages the creation and deletion of containers and domain shares (e.g., for live mount functionality), and provides a proxy service for external communications to the proper container 252. Additional details regarding the domain manager 208 and the containers 252 are discussed below in connection with FIGS. 2C and 5.

Figure 2B:
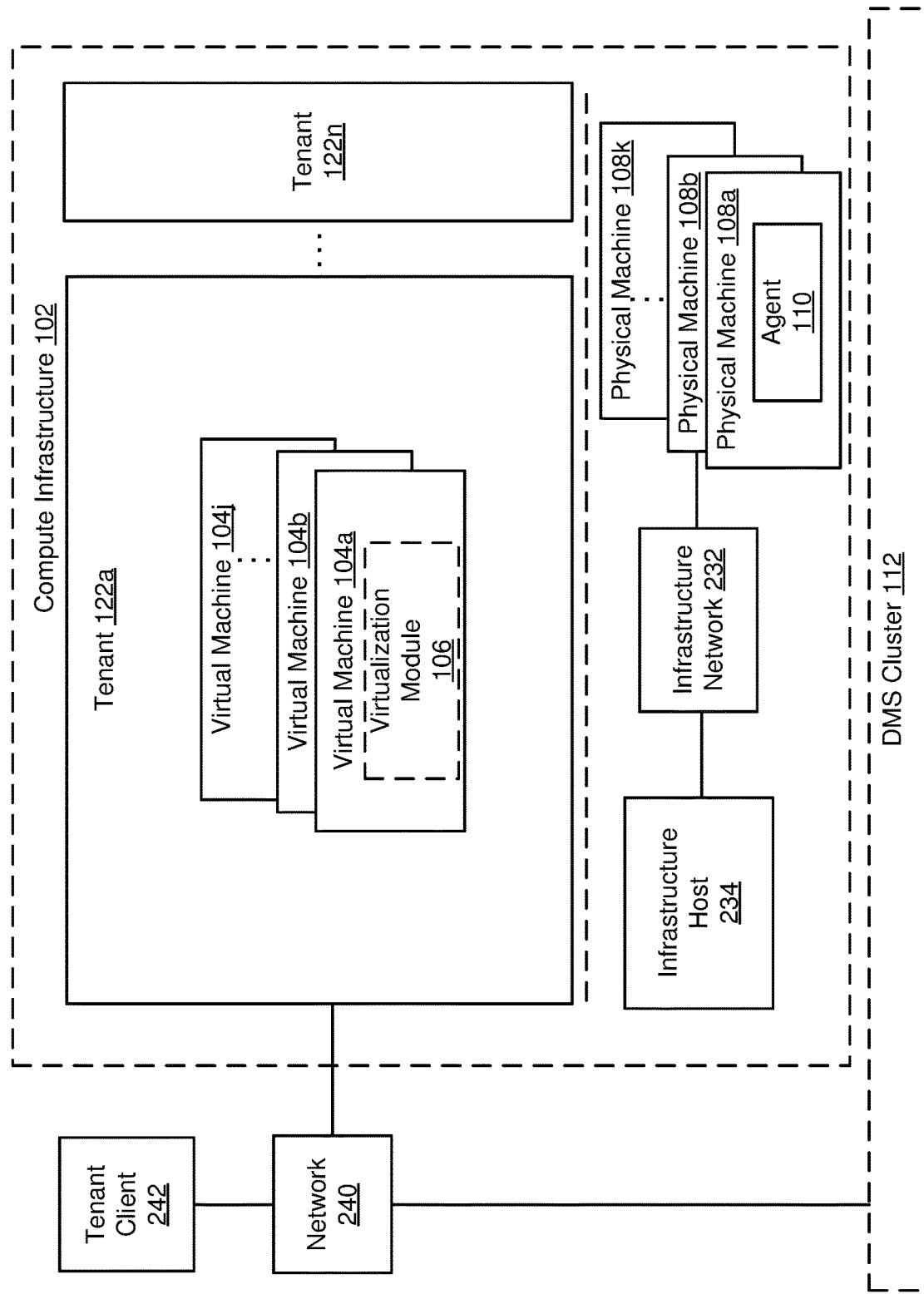
FIG. 2B is a logical block diagram of a compute infrastructure, according to one embodiment.

FIG. 2B is a logical block diagram illustrating an example compute infrastructure 102, according to one embodiment. The compute infrastructure 102 is an example of a multi-tenant compute infrastructure that provides computing resources to multiple tenants 122. Each tenant 122 may be associated with a different domain. In one example, a cloud service provider manages the compute infrastructure 102, and provides services to the tenants. The compute infrastructure 102 isolates data of different tenants from each other, such as by using separate tenant networks for each tenant 122. Similarly, the data of the tenant 122a is isolated from other machines that do not belong to the tenant 122a, such as the DMS cluster 112.

The compute infrastructure 102 include hardware components and software components that execute on the hardware components. The hardware components include physical machines 108 connected with an infrastructure host 234 via an infrastructure network 232. The hardware components of the compute infrastructure 102 may be located in a data center, or distributed across multiple data centers. The hardware components provide processing, data storage, and networking services for the tenants 122 by executing the software components of the tenants 122. In particular, hypervisors running on physical host machines may be used to create one or more virtual machines 104 for multiple tenants 122.

The compute infrastructure 102 is connected with the DMS cluster 112 and a tenant client 242 via a network 240. The network 240 may include the Internet, local area networks, and other types of private or public networks. The tenant client 242 is an example of a computing device that a user may use to access the compute infrastructure 102 via the network 240. For example, the tenant client 242 may access the compute infrastructure 102, such as via an infrastructure host 234 or other machine of the compute infrastructure 102, to configure the virtual machines 104 to execute applications that provide webpages, online services, etc. on behalf of the tenant. The tenant client 242 may also define DMS services for the tenant 122a by communicating with the DMS cluster 112 via the network 240.

The infrastructure host 234 may manage (e.g., computing and storage) resources of the physical machines 108 for sharing by the virtual machines 104. For example, the infrastructure host 234 may manage assignments of virtual machines 104 to the physical machines 108 and the resources allocation of the physical machines 108 to each virtual machine 104. The infrastructure host 234 may further provide management services for the tenant client 242, such as tenant login and account management, virtual machine configuration, network configuration, etc. The infrastructure network 232 refers to a network which connects the physical machines 108 with each other, as well as the network 240. The infrastructure network 232 may include networking components such as switches, routers, load balancers, etc. The physical machines 108 may include processing and storage hardware components, and may execute software simulations to provide the virtual machines 104 for multiple tenants 122.

Multiple tenants 122, including for example tenants 122a through 122n, may be deployed in the compute infrastructure 102. The compute infrastructure 102 is a multi-tenant compute infrastructure that isolates the machines, networks, and data of different tenants 122. The tenant 122a includes the virtual machines 104. Other tenants 122 of the compute infrastructure 102 may include the same or similar components as shown for the tenant 122a. In some embodiments, the DMS cluster 112 is connected to multiple compute infrastructures 102, each including one or more tenants, to provide DMS services to the compute infrastructures 102.

Figure 2C:
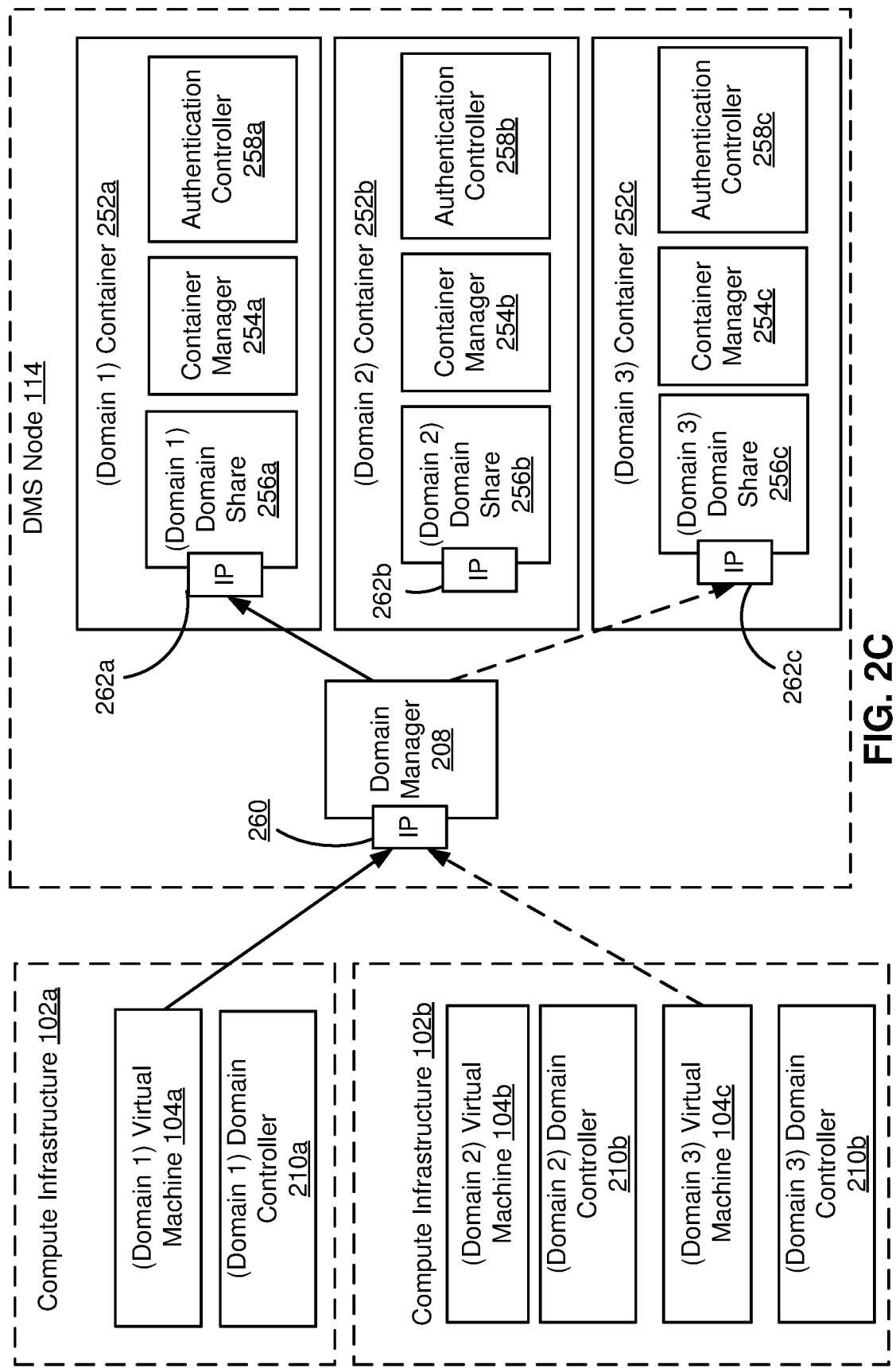
FIG. 2C is a logical block diagram of a DMS node that supports multiple domains, according to one embodiment.

FIG. 2C is a logical block diagram of a DMS node 114 that provides domain share access and authentication to multiple domains, according to one embodiment. The DMS node 114 includes the domain manager 208 and multiple containers 252. Each of the containers 252 includes one or more domain shares 256, a container manager 254, and an authentication controller 258. For each domain, the DMS node 114 includes a container 252. For example, the container 252a including domain share 256a, container manager 254*a*, and authentication controller 258*a* is associated with the Domain 1. The container 252*b* including domain share 256*b*, container manager 254*b*, and authentication controller 258*b* is associated with the Domain 2. The container 252*c* including domain share 256*c*, container manager 254*c*, and authentication controller 258*c* is associated with the Domain 3. Each domain share 256 may include one or more files. Furthermore, a container 252 may include multiple domain shares 256 associated with the same domain.

In some embodiments, a domain share 256 is a mounted snapshot of a virtual machine 104 of a compute infrastructure 102. A domain share may include one or more servers. For examples, in response to a failure of a virtual machine 104 in the compute infrastructure 102, a snapshot of the virtual machine 104 stored in the data store 118 or some other location may be deployed as a domain share 256. The connections with the virtual machine 104 in the compute infrastructure 102 may be changed to reference the domain share 256. The domain share 256 thus can provide an on demand recovery of a server or other component of an application that executes using multiple servers deployed across multiple virtual machines 104.

Compute infrastructures 102*a* and 102*b* are connected to one or more DMS nodes 114 of a DMS cluster 112. The DMS node 114 provides DMS services to the compute infrastructures 102*a* and 102*b*. The compute infrastructure 102*a* includes a virtual machines 104*a* and a domain controller 210*a*, associated with domain 1. The compute infrastructure 102*b* includes a virtual machine 104*b* and a domain controller 210*b* associated with domain 2, and a virtual machine 104*c* and a domain controller 210*c* associated with domain 3. Each domain controller 210 provides a directory service for authentication to a domain.

The virtual machines 104 shown in FIG. 2C are examples of client devices of the domain manager 208 that each connect to a particular domain share 256 of the DMS node 114. For example, the virtual machine 104*a* is associated with the Domain 1, and connects with the domain share 256*a* responsive to authorization from the domain controller 210*a*. Similarly, the virtual machine 104*c* is associated with the Domain 3, and connects with the domain share 256*c* responsive to authorization from the domain controller 210*c*. The virtual machine 104*b* is associated with the Domain 2, and although not shown in FIG. 2C for simplicity, connects with the domain share 256*c* responsive to authorization from the domain controller 210*c*. The DMS node 114 facilitates access to domain shares 256 by client devices, such as the virtual machines 104 of one or more compute infrastructures 102. The virtual machines 104 and compute infrastructures 102 may use different operating systems and protocols, and the domain shares 256 may further provide services facilitate interoperability (e.g., server message block (SMB) services).

The domain manager 208 may provide a share management service that manages the containers 252. The domain manager 208 may also provide a proxy service for communications of external devices with a selected domain share 256 based on domains of the external devices. In an example of the proxy service, the domain manager 208 may be associated with an external Internet Protocol (IP) address 260 that is used by the client devices (e.g., virtual machines 104 of a compute infrastructure 102, or other computing devices external to the DMS node 114) to connect to the domain manager 208. The domain manager 208 listens to the external IP address to receive requests from the client devices for connecting each to a domain share 256. Based on the domain of the client device, the domain manager 208 routes request to a particular domain share 256 associated with the domain. The domain manager 208 is connected to the domain shares 256 via a local network of the DMS node 114. For example, the domain share 256*a* of the container 252*a* may listen to a localhost IP address 262*a* (e.g., 127.0.0.1), the domain share server 256*b* of the container 252*b* may listen to a localhost IP address 262*b* (e.g., 127.0.0.2), the domain share 256*c* of the container 252*c* may listen to a localhost IP address 262*c* (e.g., 127.0.0.3), and so forth for each of the domain share 256.

The domain manager 208 also monitors the containers 252, creating and deleting containers 252 and their contents as needed, and setting the containers 252 with proper configurations. When a domain share 256 is no longer needed, the container 252 and domain share may be removed from the DMS node 114.

Each container 252 includes one or more domain shares 256, a container manager 254, and an authentication controller 258. For example, the container 252*a* includes a domain share 256*a*, a container manager 254*a*, and an authentication controller 258*a*. The container 252*b* includes a domain share 256*b*, a container manager 254*b*, and an authentication controller 258*b*. The container 252*c* includes a domain share 256*c*, a container manager 254*c*, and an authentication controller 258*c*. When a domain share 256 receives a request for access, the authentication controller 258 contacts the corresponding domain controller 210 of the domain. Each of the domain controller 210 provides a directory service for authorizing user and resource access to the domain share 256. If authorized, a requesting client device is granted access to the domain share 256 associated with the domain controller 210. If unauthorized, the access to the domain share 256 is denied.

The container manager 254 manages the components of the container 252. The container manager 254 may mount a snapshot of a virtual machine 104 of a compute infrastructure 102 to create a domain share 256, create an authentication controller 258 within a container 252 for the domain share 256, start and stop services of the container 252, and monitor the operations for components of the container 252. In some embodiments, the domain manager 208 may perform some or all of the functionality of the container manager 254.

In some embodiments, client devices and the DMS node 114 use different operating systems, and the domain share 256 provides interoperability between the different operating systems. For example, the client device may use the Windows operating system, while the DMS node 114 may use the Linux or Unix operating system. Here, the domains are Active Directory domains. The domain share 256 may provide protocol translation between different operating systems, such as the server messaging block (SMB) protocol used by the Windows networking file system. Each container 252 may include the Samba interoperability suite including smbd, nmbd, and winbindd services. The domain share 256 may provide the smbd service for filesharing and printing services to Windows client devices. The nmbd service, if used by the domain share 256, is a NetBIOS name server to provide NetBIOS over IP naming services to the client devices. The authentication controller 258 may provide a winbindd service for authentication on behalf of client devices to the (external) domain controller 210 of the domain. The winbindd service may further include a Name Service Switch daemon for resolving names from Windows NT servers.

The DMS node 114 supports multiple domain shares associated with different domains. The DMS node 114 provides each domain share with an authentication service to authenticate users or machines for connecting to the domain share. However, joining a computing device or node to multiple domains is not natively supported by Samba or Active Directory. Running multiple Samba instances within a computing node also does not work as Samba uses static references that are hard-coded in the source code to specify a unix socket file to communicate for authentication. As such, the DMS node 114 uses multiple containers 252 each of which joins a single domain, and a domain manager 208 to provide a domain management service that manages the containers 252 to provide a proxy service for incoming connections to the proper Samba instance within a container 252.

In some embodiments, the DMS node 114 provides a "live mount" capability to the compute infrastructure 102. An application executing in the compute infrastructure 102 may include databases and servers such as database servers, file servers, and application servers. These resources may be distributed across multiple virtual machines 104. If a virtual machine 104 of the (e.g., production) environment fails in the compute infrastructure 102 or for some other purpose, the DMS node 114 may mount a previous version of the virtual machine 104 from a snapshot, and then other virtual machines 104 of the application may be connected to the mounted virtual machine 104 to execute the application. Here, a domain share 256 may be used as a (e.g., temporary) resource for the compute infrastructure 102, such as for disaster recovery, adhoc queries (e.g., selective restoration of a portion of a database), health check, or testing purposes. In particular, the snapshot of the virtual machine 104 of the compute infrastructure is mounted in the DMS node 114 or some other location to create a domain share 256, and then the domain share 256 is connected to the compute infrastructure 102 in place of the virtual machine 104. This process may be performed seamlessly, and without interruption of services or functionality of the application executing in the compute infrastructure 102. The domain share 256 may be created based on a prior backup of the virtual machine 104 to provide a usable server, database, etc., and may be mounted responsive to a failure of the same virtual machine 104 in the (e.g., production) compute infrastructure 102. The snapshot may be mounted within a DMS node 114 as shown in FIG. 2C, or may be mounted to the compute infrastructure 102, archive system 120, or some other computing device. In some embodiments, the snapshot may be mounted across multiple peer DMS nodes 114. Responsive to the failed virtual machine 104 being restored in the compute infrastructure 102, the domain share 256 and the corresponding container 252 may be removed from the DMS node 114 to decrease resource utilization in the DMS cluster 112.

In some embodiments, each DMS node 114 of a DMS cluster 112 is allocated to a single domain such that the DMS nodes 114 collectively provide authentication to multiple domains. However, it may be advantageous for the DMS cluster 112 to include homogeneous DMS nodes 114. Furthermore, designating specific domain shares to specific nodes 114 may result in performance bottlenecks. As such, each DMS node 114 may include multiple containers 252 each dedicated to a different domain.

FIGS. 3 and 4 illustrate operation of the DMS system shown in FIGS. 1-2. FIG. 3A is an example of a service schedule 222. The service schedule defines which services should be performed on what machines at what time. It can be set up by the user via the user interface, automatically generated, or even populated through a discovery process. In this example, each row of the service schedule 222 defines the services for a particular machine. The machine is identified by machine_user_id, which is the ID of the machine in the compute infrastructure. It points to the location of the machine in the user space, so that the envoy or DMS cluster can find the machine in the compute infrastructure. In this example, there is a mix of virtual machines (VMxx) and physical machines (PMxx). The machines are also identified by machine_id, which is a unique ID used internally by the DMS cluster.

The services to be performed are defined in the SLA (service level agreement) column. Here, the different SLAs are identified by text: standard VM is standard service for virtual machines. Each SLA includes a set of DMS policies (e.g., a backup policy, a replication policy, or an archival policy) that define the services for that SLA. For example, "standard VM" might include the following policies:

Backup policy: The following backups must be available on the primary DMS cluster 112x: every 6 hours for the prior 2 days, every 1 day for the prior 30 days, every 1 month for the prior 12 months.

Replication policy: The backups on the primary DMS cluster for the prior 7 days must also be replicated on the secondary DMS cluster 112y.

Archive policy: Backups that are more than 30 days old may be moved to the archive system 120.

The underlines indicate quantities that are most likely to vary in defining different levels of service. For example, "high frequency" service may include more frequent backups than standard. For "short life" service, backups are not kept for as long as standard.

From the service schedule 222, the job schedulers 204 populate the job queue 224. FIG. 3B is an example of a job queue 224. Each row is a separate job. job_id identifies a job and start_time is the scheduled start time for the job. job_type defines the job to be performed and job_info includes additional information for the job. Job 00001 is a job to "pull snapshot" (i.e., take backup) of machine m001. Job 00003 is a job to replicate the backup for machine m003 to the secondary DMS cluster. Job 00004 runs analytics on the backup for machine m002. Job 00005 is an internal trash collection job. The jobs in queue 224 are accessible by any of the job engines 206, although some may be assigned or preferred to specific DMS nodes.

FIG. 3C are examples of a snapshot table 226 and image table 228, illustrating a series of backups for a machine m001. Each row of the snapshot table is a different snapshot and each row of the image table is a different image. The snapshot is whatever is being backed up at that point in time. In the nomenclature of FIG. 3C, m001.ss1 is a snapshot of machine m001 taken at time t1. In the suffix ".ss1", the .ss indicates this is a snapshot and the 1 indicates the time t1. m001.ss2 is a snapshot of machine m001 taken at time t2, and so on. Images are what is saved in the data store 118. For example, the snapshot m001.ss2 taken at time t2 may not be saved as a full backup. Rather, it may be composed of a full backup of snapshot m001.ss1 taken at time t1 plus the incremental difference between the snapshots at times t1 and t2. The full backup of snapshot m001.ss1 is denoted as m001.im1, where ".im" indicates this is an image and "1" indicates this is a full image of the snapshot at time t1. The incremental difference is m001.im1-2 where "1-2" indicates this is an incremental image of the difference between snapshot m001.ss1 and snapshot m001.ss2.

In this example, the service schedule indicates that machine m001 should be backed up once every 6 hours. These backups occur at 3 am, 9 am, 3 pm and 9 pm of each day. The first backup occurs on Oct. 1, 2017 at 3 am (time t1) and creates the top rows in the snapshot table 226 and image table 228. In the snapshot table 226, the ss_id is the snapshot ID which is m001.ss1. The ss_time is a timestamp of the snapshot, which is Oct. 1, 2017 at 3 am. im_list is the list of images used to compose the snapshot. Because this is the first snapshot taken, a full image of the snapshot is saved (m001.im1). The image table 228 shows where this image is saved in the data store 118.

On Oct. 1, 2017 at 9 am (time t2), a second backup of machine m001 is made. This results in the second row of the snapshot table for snapshot m001_ss2. The image list of this snapshot is m001.im1 and m001.im1-2. That is, the snapshot m001_ss2 is composed of the base full image m001.im1 combined with the incremental image m001.im1-2. The new incremental image m001.im1-2 is stored in data store 118, with a corresponding entry in the image table 228. This process continues every 6 hours as additional snapshots are made.

For virtual machines, pulling a snapshot for the VM typically includes the following steps: freezing the VM and taking a snapshot of the VM, transferring the snapshot (or the incremental differences) and releasing the VM. For example, the DMS cluster may receive a virtual disk file that includes the snapshot of the VM. The backup process may also include deduplication, compression/decompression and/or encryption/decryption.

From time to time, these tables and the corresponding data are updated as various snapshots and images are no longer needed or can be consolidated. FIGS. 4A-4D show an example of this. FIG. 4A shows the snapshot table and image table after backups have been taken for 3 days using the process described in FIG. 3. However, if the service schedule requires 6-hour backups only for the past 2 days, then the 6-hour backups for the first day October 1 are no longer needed. The snapshot m001.ss1 is still needed because the service schedule requires daily backups, but snapshots .ss2, .ss3 and .ss4 can be deleted and are removed from the snapshot table, as indicated by the cross-hatching in FIG. 4B. However, the incremental images .im1-2, .im2-3 and .im3-4 are still required to build the remaining snapshots.

In FIG. 4C, the base image is updated from .im1 to .im5. That is, a full image of snapshot 5 is created from the existing images. This is a new row at the bottom of the image table 228. The im_list for snapshots .ss5 to .ss12 are also updated to stem from this new base image .im5. As a result, the incremental images .im1-2, .im2-3, .im3-4 and .im4-5 are no longer required and they can be deleted from the data store and from the image table 228. However, the data store now contains two full images: .im1 and .im5. Full images are usually much larger than incremental images. This redundancy can be addressed by creating a backwards incremental image .im5-1, shown in FIG. 4D as a new row in the image table 228. With the addition of this backwards incremental image, the full image .im1 is no longer needed.

Figure 5:
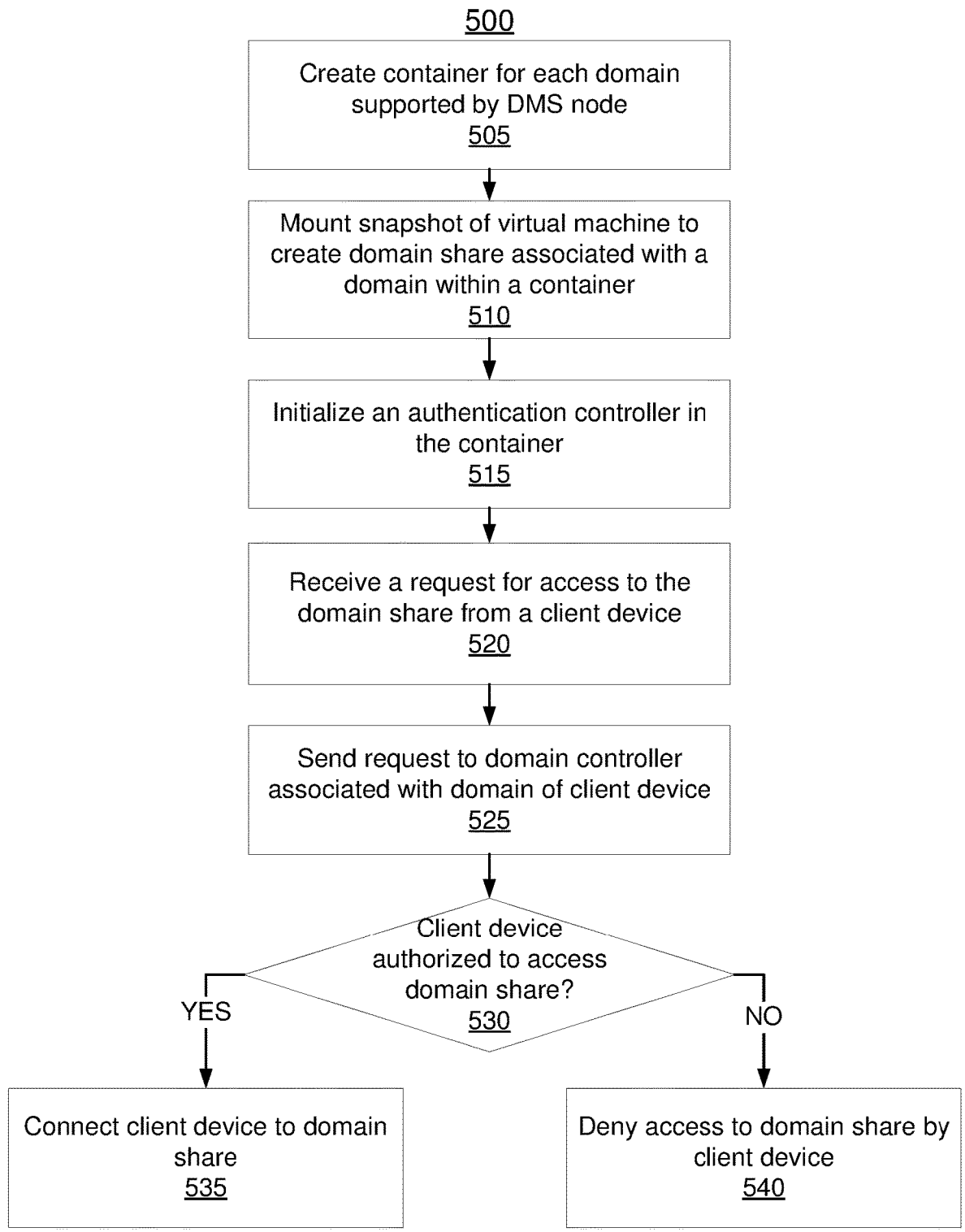
FIG. 5 is a flow chart of a process for providing access to multiple domain shares by a DMS node, according to one embodiment.

FIG. 5 is a flow chart of a process 500 for controlling access to multiple domain shares by a DMS node, according to one embodiment. The process 500 is discussed as being performed by a DMS node 114 of a DMS cluster 112, although other types of computing structures may be used. In some embodiments, the process 500 may include different and/or additional steps, or some steps may be in different orders.

The DMS node 114 (e.g., domain manager 208) creates 505 a container 252 for each domain supported by the DMS node 114. In order for the node 114 to provide a domain share with directory service (e.g., Windows Active Directory) authentication, the node 114 needs to join a domain. Multiple containers that each joins a single domain may be created in the DMS node 114 as needed to serve multiple domains. In some embodiments, the domain manager 208 creates a container manager 254 within the container 252 which manages the contents of the container 252.

The DMS node 114 (e.g., container manager 254) mounts 510 a snapshot of a virtual machine 104 to create a domain share 256 associated with a domain within a container 252 of the domain. The snapshot may be previously captured from a virtual machine 104 of a compute infrastructure 102, and may include full or incremental images. The snapshot may be captured for backup, replication, archive, or data recovery purposes. The snapshot may be retrieved from the data store 118 of the DMS cluster 112, the archive system 120, or some other location. The container manager 254 configures the domain share 256 with proper authentication so that only authorized user users or devices can access various resources of the domain share 256. In some embodiments, the snapshot may be mounted in various locations, such as within the container 252 associated with the domain, elsewhere in the DMS node 114, distributed across multiple DMS nodes 1124, or external to the DMS cluster 112. In some embodiments, the DMS node 114 uses different operating systems from client devices that connect to the DMS node 114, and the domain share 256 provides interoperability between the operating systems. For example, the domain share 256 may include the Samba interoperability suite to interface between Windows and Linux/Unix machines. Here, it is advantageous for each domain handled by the DMS node 114 to use a different container 252 because joining Samba to multiple domains is not natively supported for a single computer or node.

The DMS node 114 (e.g., container manager 254) initializes 515 an authentication controller 258 in the container 252. Each authentication controller 258 provides an authentication service for a different domain that communicates with a domain controller 210 to authorize user accounts or computing devices. The domain controller 210 provides a directory service which listens to requests from the authentication controller 258. When the domain controller 210 uses the Windows operating system, for example, the domain controller 210 provides an Active Directory authentication service. In some embodiments, the domain share 256 provides the authentication service, and the authentication controller 258 may be omitted from the container 252.

The DMS node 114 (e.g., domain manager 208) receives 520 a request for access to the domain share 256 from a client device. The client device may be a virtual machine 104 of the compute infrastructure 102, or some other computing device. The client device may request access to one or more files or some other resource of the domain share 256. The client device connects to the domain manager 208 using the external IP address to access the domain share 256. In some embodiments, the client device is disconnected from a resource (e.g., database, server, etc.) of the compute infrastructure 102, and is connected to the domain share 256 to access a previously captured version of the resource.

The DMS node 114 is associated with an external IP address for communication with the compute infrastructure 102, and the domain manager 208 listens to the external IP address. Each container 252 may be associated with a different localhost IP address used internally within the DMS node 114 or DMS cluster 112. The domain share 256 within each container 252 listens to the localhost IP address of the container 252 for communication with the domain manager 208, and the client device via the domain manger 208.

For example, the domain share 256a of the container 252a may listen to the localhost IP address 127.0.0.1, the domain share 256b of the container 252b may listen to the localhost IP address 127.0.0.2, the domain share 256c of the container 252c may listen to the localhost IP address 127.0.0.3, and so forth for each of the containers of the DMS node 114.

In some embodiments, the client device includes a database (e.g., MSSQL) server and the domain share 256 includes a database that is accessed by the database server. The database server requests access to the domain share 256 to connect to the database, thus allowing the database server to query the database. In order to have proper authentication, the domain share 256 joins the domain of the database server so that authorized users and machines are allowed to access the domain share, while unauthorized users or machines are denied access. In some embodiments, the domain share 256 includes a (e.g., HyperV) server accessed by the client device, such as a database server, file server, or application server.

In some embodiments, the domain manager 208 associates source IP addresses of client devices with domains. The IP address of the client device in the request is used to determine the domain of the client device, and routing of the request to the corresponding domain share 256 of the domain. In some embodiments, the client device provides a name or other identifier of the domain with the request to the domain manager 208.

In some embodiments, the client device provides authentication information for accessing the domain to the domain manager 208 in connection with the request. The authentication information may include user information for authorizing a user, or computer information for authorizing a computer. The authentication information may include a user name, password, or other credentials.

The DMS node 114 (e.g., authentication controller 258) sends 525 the request from the client device to a domain controller 210 associated with the domain of the client device. For example, when the domain share 256 receives the request for access to the domain share 256 from the domain manager 208, the authentication controller 258 requests authentication credentials from the client device, receives the credentials, and sends the credentials to the domain controller 210 associated with the domain. As such, the domain manager 208 provides a proxy service for each of the containers 252 for external communication, and routes received requests for accessing domain shares 256 to the appropriate container 252 according to the domains associated with the requests. The container contacts the corresponding domain controller 210 of the domain to complete the authentication.

The domain controller 210 determines 530 whether the client device is authorized to access the domain share. For example, the domain controller 210 provides the directory service for authorizing the client device or user account associated with the client device, which is called by the authentication controller 258. The domain controller 210 may use the authentication information received from the client device via the authentication controller 258 to determine whether to authorize the access to the domain share 256. Some examples of authentication information include user names, passwords, digital certificates, tokens, biometric information, keys, etc. The request may also indicate a particular resource of the domain share 256, with different resources requiring different authentication information.

If access to the domain share 256 is authorized, the client device is connected 535 with the domain share 256 for communication. For example, the domain controller 210 checks the credentials, and responds to the request from the authentication controller 258 with an indication regarding whether the credentials are accepted or not. If the domain share 256 includes a database, then the client device is connected to the database. In another example, the domain share 256 may include a file server, database server, or application server that is accessed by the client device if authorization is successful.

If access to the domain share fails to be authorized, the domain controller 210 denies 540 access to the domain share 256 by the client device. For example, the client device or user account may have failed to provide valid authentication information for the domain, and thus access to the domain share 256 is denied.

Figure 6:
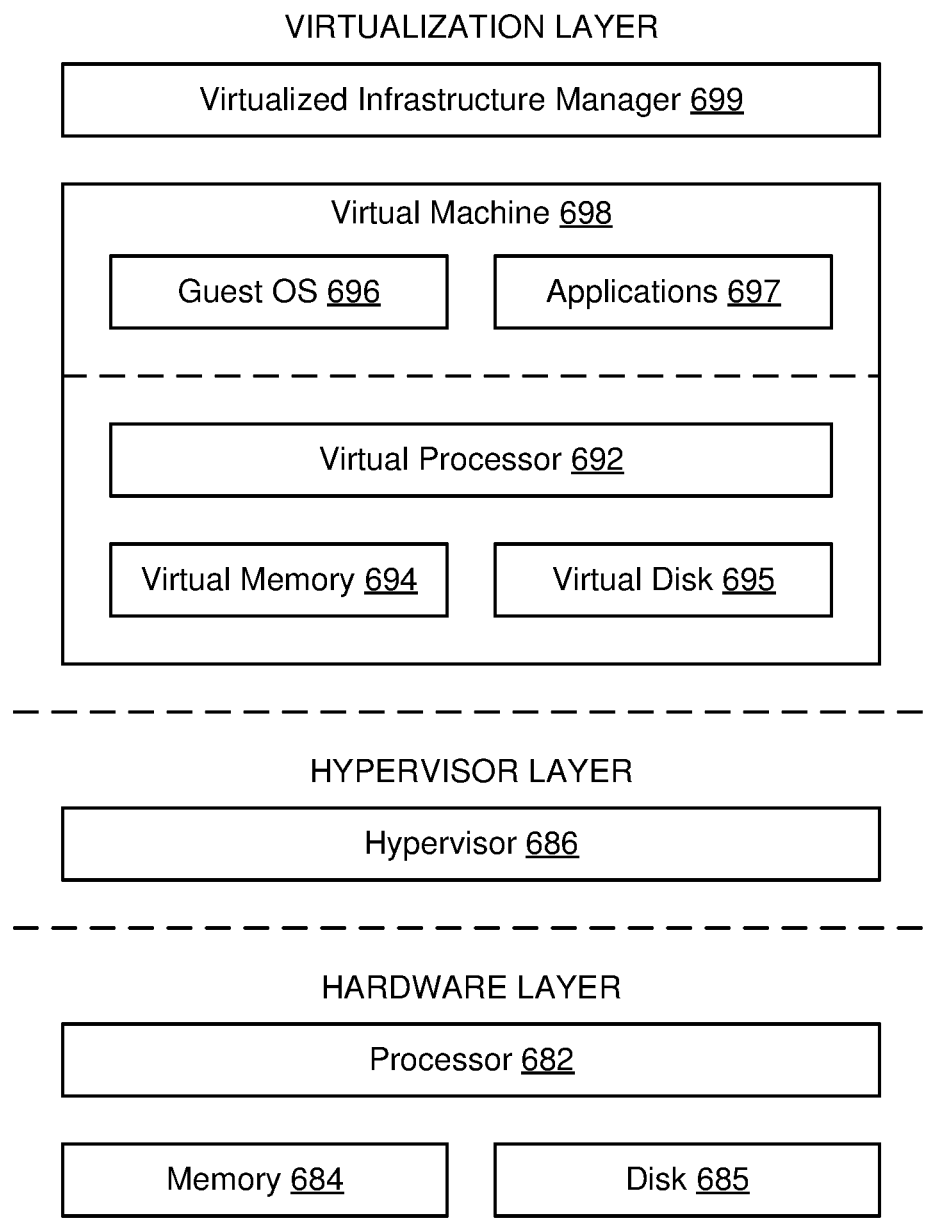
FIG. 6 is a block diagram of a virtual machine, according to one embodiment.

FIG. 6 is a block diagram of a server for a VM platform, according to one embodiment. The server includes hardware-level components and software-level components. The hardware-level components include one or more processors 682, one or more memory 684, and one or more storage devices 685. The software-level components include a hypervisor 686, a virtualized infrastructure manager 699, and one or more virtual machines 698. The hypervisor 686 may be a native hypervisor or a hosted hypervisor. The hypervisor 686 may provide a virtual operating platform for running one or more virtual machines 698. Virtual machine 698 includes a virtual processor 692, a virtual memory 694, and a virtual disk 695. The virtual disk 695 may comprise a file stored within the physical disks 685. In one example, a virtual machine may include multiple virtual disks, with each virtual disk associated with a different file stored on the physical disks 685. Virtual machine 698 may include a guest operating system 696 that runs one or more applications, such as application 697. Different virtual machines may run different operating systems. The virtual machine 698 may load and execute an operating system 696 and applications 697 from the virtual memory 694. The operating system 696 and applications 697 used by the virtual machine 698 may be stored using the virtual disk 695. The virtual machine 698 may be stored as a set of files including (a) a virtual disk file for storing the contents of a virtual disk and (b) a virtual machine configuration file for storing configuration settings for the virtual machine. The configuration settings may include the number of virtual processors 692 (e.g., four virtual CPUs), the size of a virtual memory 694, and the size of a virtual disk 695 (e.g., a 10 GB virtual disk) for the virtual machine 695.

The virtualized infrastructure manager 699 may run on a virtual machine or natively on the server. The virtualized infrastructure manager 699 corresponds to the virtualization module 106 above and may provide a centralized platform for managing a virtualized infrastructure that includes a plurality of virtual machines. The virtualized infrastructure manager 699 may manage the provisioning of virtual machines running within the virtualized infrastructure and provide an interface to computing devices interacting with the virtualized infrastructure. The virtualized infrastructure manager 699 may perform various virtualized infrastructure related tasks, such as cloning virtual machines, creating new virtual machines, monitoring the state of virtual machines, and facilitating backups of virtual machines.

Figure 7:
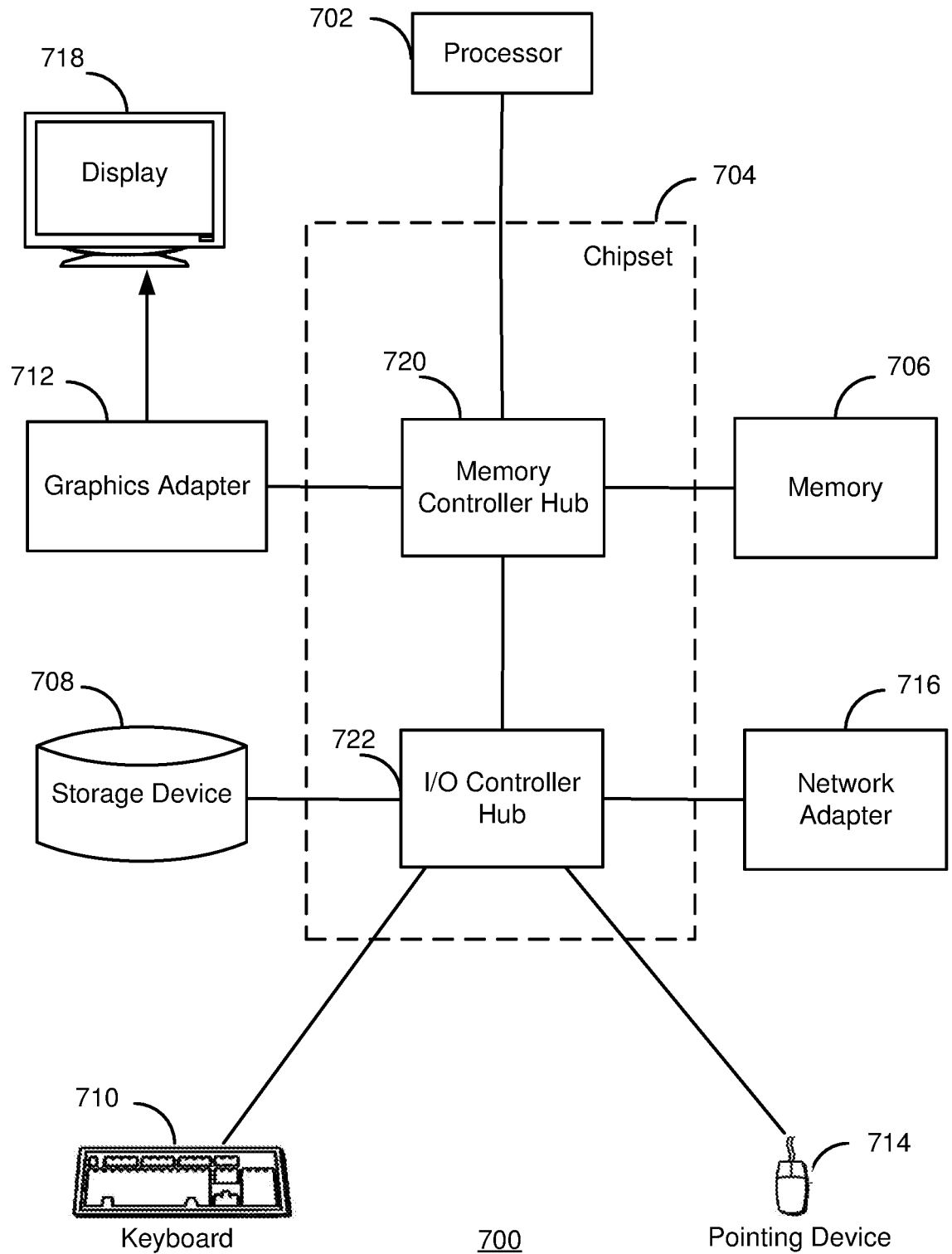
FIG. 7 is a block diagram of a computer system suitable for use in a DMS system, according to one embodiment.

FIG. 7 is a high-level block diagram illustrating an example of a computer system 700 for use as one or more of the components shown above, according to one embodiment. Illustrated are at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display device 718 is coupled to the graphics adapter 712. A storage device 708, keyboard 710, pointing device 714, and network adapter 716 are coupled to the I/O controller hub 722. Other embodiments of the computer 700 have different architectures. For example, the memory 706 is directly coupled to the processor 702 in some embodiments.

The storage device 708 includes one or more non-transitory computer-readable storage media such as a hard drive, compact disk read-only memory (CD-ROM), DVD, or a solid-state memory device. The memory 706 holds instructions and data used by the processor 702. The pointing device 714 is used in combination with the keyboard 710 to input data into the computer system 700. The graphics adapter 712 displays images and other information on the display device 718. In some embodiments, the display device 718 includes a touch screen capability for receiving user input and selections. The network adapter 716 couples the computer system 700 to a network. Some embodiments of the computer 700 have different and/or other components than those shown in FIG. 7. For example, the virtual machine 102, the physical machine 104, and/or the DMS node 110 can be formed of multiple blade servers and lack a display device, keyboard, and other components.

The computer 700 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 708, loaded into the memory 706, and executed by the processor 702.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. In a data management and storage (DMS) cluster comprising a plurality of peer DMS nodes, a method for providing a domain share to a compute infrastructure serviced by the DMS cluster, the method comprising:
   a domain manager of a DMS node creating a container for a domain of the compute infrastructure, the container including a domain share;
   the domain manager selecting the container for receiving a request from a client device of the compute infrastructure associated with the domain from a plurality of containers associated with different domains based on the domain of the client device corresponding to the domain of the container;
   the container receiving the request for access to the domain share from the domain manager;
   the container determining whether the client device is authorized to access to the domain share based on contacting the compute infrastructure with authentication information from the client device; and
   the domain share connecting with the client device in response to the client device being authorized to access the domain share.

2. The method of claim 1, further including:
   listening, by the domain manager, to an external Internet Protocol (IP) address for the request to access the domain share from the client device; and
   in response to the request, sending, by the domain manager, the request to access the domain share to the container using a localhost IP address of the container.

3. The method of claim 2, wherein:
   each of the plurality of containers is connected to the domain manager using a local network of the DMS node; and
   the domain manager provides a proxy service for communication external to the DMS node by the plurality of containers.

4. The method of claim 1, further comprising mounting one or more snapshots of a virtual machine within the container to create the domain share associated with the domain.

5. The method of claim 4, wherein:
   the virtual machine is a first virtual machine of the compute infrastructure; and
   the client device is a second virtual machine of the compute infrastructure different from the first virtual machine.

6. The method of claim 5, further including disconnecting the client device from another instance of the first virtual machine in the compute infrastructure.

7. The method of claim 4, further comprising, by the peer DMS nodes, generating the one or more snapshots and storing the one or more snapshots in a distributed data store implemented across the peer DMS nodes.

8. The method of claim 1, further comprising the domain manager associating an IP address of the client device with the domain, and identifying the domain of the client device based on the IP address.

9. The method of claim 1, wherein the domain share includes a database and the client device includes a database server that queries the database when the client device is connected to the domain share.

10. The method of claim 1, wherein the domain share includes a first server and the client device includes a second server that communicates with the first server when the client device is connected to the domain share.

11. The method of claim 1, wherein:
    the client device uses a first operating system and the DMS node uses a second operating system different from the first operating system; and
    the domain share provides protocol translation between the first and second operating systems.

12. The method of claim 11, wherein the first operating system includes Windows, the second operating system includes Linux or Unix; and the domain share includes a Samba instance.

13. The method of claim 1, wherein the domain includes an Active Directory domain and the compute infrastructure includes a domain controller that provides an Active Directory service to authorize the client device for access to the domain share.

14. The method of claim 1, wherein determining whether the client device is authorized to access to the domain share based on the authentication information from the client device includes determining whether a user account associated with the client device is authorized to access the domain share.

15. The method of claim 1, wherein the container determining whether the client device is authorized to access to the domain share based on contacting the compute infrastructure with the authentication information from the client device includes:
- an authentication controller of the container sending the authentication information to a domain controller of the compute infrastructure associated with the domain; and
- the authentication controller receiving an indication from the domain controller from the domain controller whether to authorize access to the domain share; and
- the authentication controller providing the indication to the domain share.

16. The method of claim 1, further comprising creating, by the domain manager of the DMS node, another container for another domain, the other container including another domain share associated with another domain.

17. The method of claim 16, wherein the other domain is associated with another compute infrastructure different from the compute infrastructure.

18. The method of claim 1, wherein the domain manager provides a proxy service for each of the plurality of containers, each of the plurality of containers providing an authentication service accessible via the domain manager.

19. A data management and storage (DMS) cluster, comprising:
- a plurality of peer DMS nodes that service a first compute infrastructure and a second compute infrastructure; and
- a distributed data store implemented across the peer DMS nodes;
- wherein each of the peer DMS nodes includes:
  - a first container for a first domain of the first compute infrastructure, the first container including a first domain share generated from one or more snapshots of the first compute infrastructure stored in the distributed data store;
  - a second container for a second domain of the second compute infrastructure, the second container including a second domain share generated from one or more snapshots of the second compute infrastructure stored in the distributed data store; and
  - a domain manager configured to
    - receive authentication information from a client device;
    - determine a domain of the client device;
    - send the authentication information to the first container to authorize the client device for access to the first domain share in response to the domain being the first domain; and
    - send the authentication information to the second container to authorize the client device for access to the second domain share in response to the domain being the second domain.

20. A non-transitory computer-readable medium comprising instructions that when executed by a processor cause the processor to execute a method for providing a domain share to a compute infrastructure serviced by the DMS cluster, the DMS cluster including a plurality of peer DMS nodes, the method comprising:
- a domain manager of a DMS node creating a container for a domain of the compute infrastructure, the container including the domain share;
- the domain manager selecting the container for receiving a request to access the domain share from a client device of the compute infrastructure associated with the domain from a plurality of containers associated with different domains based on the domain of the client device corresponding to the domain of the container;
- the container receiving the request for access to the domain share from the domain manager;
- the container determining whether the client device is authorized to access to the domain share based on contacting the compute infrastructure with authentication information from the client device; and
- the domain share connecting with the client device in response to the client device being authorized to access the domain share.

\* \* \* \* \*